(12) United States Patent
Lortz

(10) Patent No.: US 6,910,076 B2
(45) Date of Patent: Jun. 21, 2005

(54) NETWORK-BASED DETECTION AND DISPLAY OF PRODUCT REPLACEMENT INFORMATION

(75) Inventor: Victor Lortz, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/339,265

(22) Filed: Jun. 23, 1999

(65) Prior Publication Data

US 2003/0041098 A1 Feb. 27, 2003

(51) Int. Cl.$^7$ ............................................... G06F 15/16
(52) U.S. Cl. ........................ 709/229; 709/217; 709/219; 709/225; 709/245
(58) Field of Search ................................ 709/217, 219, 709/225, 229, 245; 705/27, 29, 26, 28

(56) References Cited

U.S. PATENT DOCUMENTS

| | | | | |
|---|---|---|---|---|
| 5,216,612 A | * | 6/1993 | Cornett et al. ................. | 700/96 |
| 5,740,425 A | * | 4/1998 | Povilus ....................... | 707/100 |
| 5,765,143 A | * | 6/1998 | Sheldon et al. ............... | 705/28 |
| 5,877,692 A | * | 3/1999 | Watanabe et al. ........... | 340/679 |
| 5,923,014 A | * | 7/1999 | Szymusiak et al. ......... | 235/375 |
| 5,978,773 A | * | 11/1999 | Hudetz et al. ................ | 705/23 |
| 6,064,979 A | * | 5/2000 | Perkowski ................... | 705/26 |
| 6,101,486 A | * | 8/2000 | Roberts et al. ............... | 705/27 |
| 6,122,560 A | * | 9/2000 | Tsukishima et al. ........ | 700/106 |
| 6,134,548 A | * | 10/2000 | Gottsman et al. ............. | 707/5 |
| 6,154,738 A | * | 11/2000 | Call ............................. | 707/4 |
| 6,167,383 A | * | 12/2000 | Henson ........................ | 705/26 |
| 6,321,262 B1 | * | 11/2001 | Springer ...................... | 709/223 |
| 6,595,417 B2 | * | 7/2003 | O'Hagan et al. ............ | 235/383 |
| 6,647,532 B1 | * | 11/2003 | Boede et al. ................ | 715/513 |
| 6,834,268 B2 | * | 12/2004 | Junger ......................... | 705/28 |

* cited by examiner

Primary Examiner—Saleh Najjar
(74) Attorney, Agent, or Firm—Blakely, Sokoloff, Taylor & Zafman LLP

(57) ABSTRACT

A method and system for determining part replacement related information by an end user. A user scans an identifier associated with a part. A scanner interface automatically couples the scanned identifier to a network enabled browser. The browser automatically connects over a network connection to a remote database to retrieve replacement related information for the part, where such database searchable by the associated identifier. The retrieved replacement related information for the part is automatically displayed for the end user. The retrieved information may also contain information related to the part, such as related parts that also need to be replaced, along with instructions, concerns, and warnings related to replacing the part. This information may be processed by an expert-type system, allowing the end user to engage in an interactive session regarding the part replacement. This information may also include expert-system instructions, e.g., a rule-set or the like, allowing the expert system to interactively aid the end user in diagnosing the nature and/or extent of the part defect, and help the end user to effect proper maintenance.

68 Claims, 5 Drawing Sheets

NETWORK-BASED DETECTION AND DISPLAY OF PRODUCT REPLACEMENT INFORMATION

FIELD OF THE INVENTION

The invention generally relates to locating vendors stocking a part needing replacement, and more particularly, to scanning an identifier affixed or associated with the part, and then retrieving potential vendors from a database of vendors.

BACKGROUND OF THE INVENTION

We live in a technological era. As time progresses, common everyday items become increasingly more complex. Thus, when something breaks, it is no longer a simple task to identify what has broken, and where to obtain a replacement or repair. In particular, in a complex device, one broken part may signal required modifications or replacements for other parts that do not appear to need servicing. Thus, identification of all parts needing replacement can be a somewhat challenging task. The term "part" is intended to refer to any replaceable device (or portion thereof), appliance, or other piece of equipment, such as refrigerators, pipes/tubing, computing devices, bicycles, radios, computer peripherals (e.g., printers or print cartridges, and the like). The term "part" is not intended to refer to any particular class of replaceable goods, such as high-tech components.

Thus, for example, a user might receive notification that a printer's print-head needs replacement. However, the printer manufacturer might also require, or strongly advise, that a related component also be replaced at the same time. Or, the manufacturer might advise that certain cleaning or other printer maintenance be performed when print heads are replaced. And, it is possible that the print head has not malfunctioned, but that another part has failed, causing an erroneous report of print head failure. These related issues and concerns are not properly identified and addressed by a simple notification that the print head has stopped functioning.

Or, a home heating system may fail. Here, however, there is likely to be no indicator suggesting what might have gone wrong, or where to begin searching for what has gone wrong. Although some devices, especially in the high-tech context, have become more adept at performing self-diagnostics to help determine what is wrong with a device (e.g., a light indicating printer head replacement), most devices are not capable of self-diagnostics. In the heating-system context, the failure may be due to a failure in a pilot light for an oil-based heating system, or a faulty fuel nozzle, a kink in a fuel line to the nozzle components, a clogged fuel line filter, or some other type of problem. Here, a manual inspection is required to determine what needs to be replaced, as well as manual identification of related parts (or other concerns) for a part that needs to be replaced. In the context of complex heating systems, this search can be difficult.

Naturally, a device can be expected to be shipped along with detailed instructions to aid in a problem-determination process. However, for complicated devices such as heating systems, computer network devices, etc., the instructions are typically used by an installer of the system. When a problem arises, the typical end-user may no longer have access to these instructions. In addition, assuming the end-use can identify what needs to be replaced, there still is the issue of locating a vendor for replacement parts.

Frequently, instructions propose a vendor (usually the manufacturer) for obtaining replacement parts. But, such advice may be very costly, and may also be stale by the time it is needed (e.g., the manufacturer or other listed vendors may no longer support the device). And, such instructions usually do not provide information to determine part inter-dependencies. Thus, necessary or suggested maintenance might not be performed simply because it is not known to be related to a particular part failure. And finally, even the best manual is of little use when, as noted above, the instructions are unavailable, lost or damaged, when they are needed.

What is needed, then, is a straightforward and efficient system for automatically identifying a part that has failed, and for determining related part failures or related replacement concerns for a failed part.

SUMMARY

A method and system for determining part replacement related information by an end user. A user obtains an identifier associated with a part. A scanner interface automatically couples the obtained identifier to a network enabled browser. The browser automatically connects over a network connection to a remote database to retrieve replacement related information for the part, where such database is searchable by the associated identifier. The retrieved replacement related information for the part is automatically displayed for the end user.

DETAILED DESCRIPTION

Figure 1:
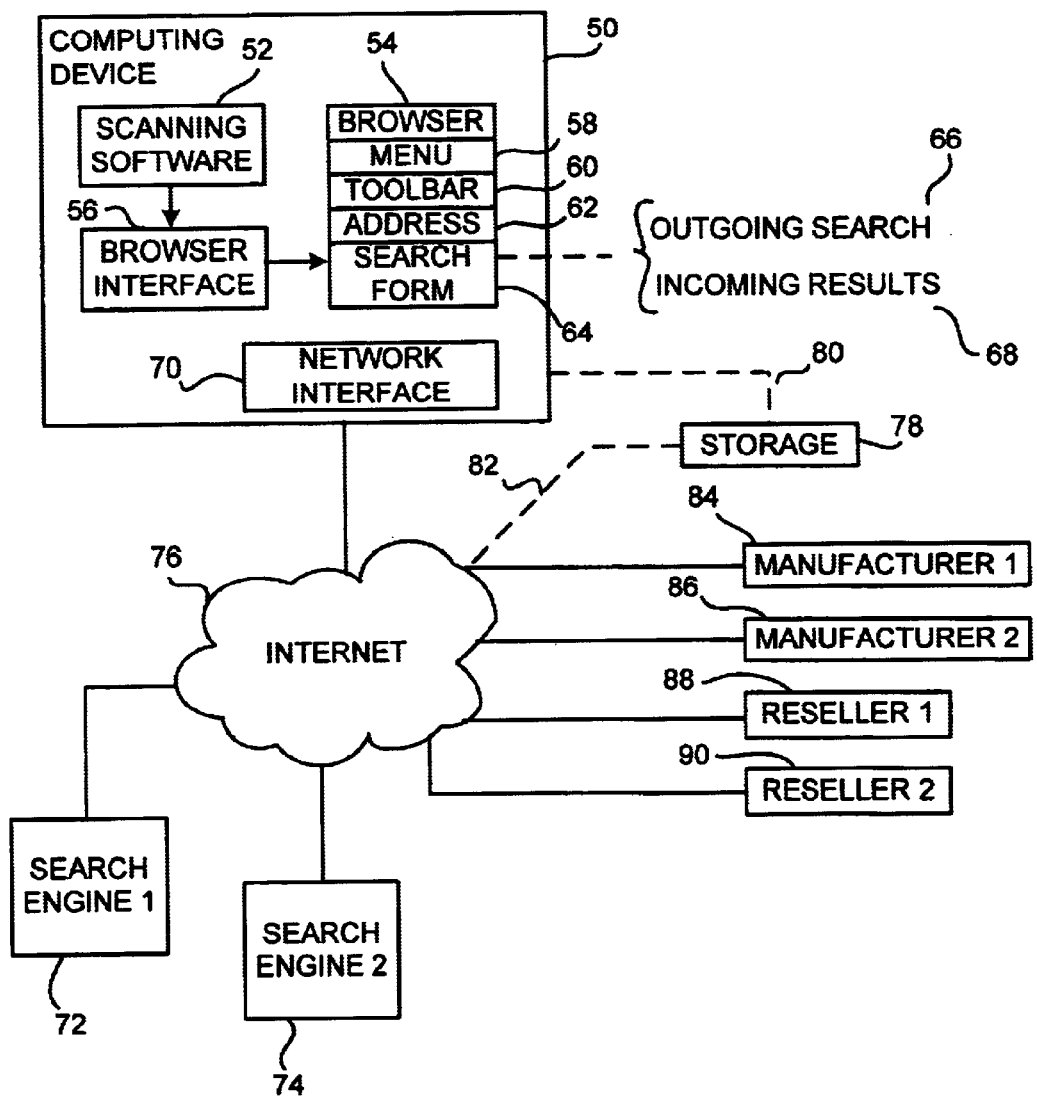
FIG. 1 illustrates a simple browser-base environment in which the invention can be practiced.

FIG. 1 illustrates a simple browser-based environment in which the invention can be practiced. In this simplified arrangement, data about a defective part is obtained (over a network connection), and only basic processing of retrieved data is performed. A user, expert system, or other program component is required to perform analysis and decision-making based on retrieval results.

Shown is a computing device 50, which may be a typical computer (see e.g., FIG. 6), or some other computing device capable of performing the described actions (e.g., a personal digital assistant (PDA), hand-held computer running Windows CE, etc.) (Note that all marks referenced herein are the property of their respective owners.) Executing on the computing device are scanning software 52, browser software 54, and a browser interface 56 to integrate the scanning software with the browser.

The browser 54 can contain typical browser portions such as a menu bar 58, toolbar 60, address field 62, client window 64 (shown containing a search form for initiating a search 66 and receiving results 68), etc. However, the browser configuration may be controlled/modified by the scanning software 54 and/or browser interface 56. For example, browser portions 58–62 may be suppressed when an Application Programming Interface (API) (e.g., Microsoft Corporation's JDirect API), JavaScript, ActiveX, Java, or equivalent control system is used that provides direct control over the browser. In such a configuration, the browser may be configured to only show the client window 64 search form for performing an outgoing search 66 and receiving its search results 68. For example, the client window may be controlled by providing (e.g., setting the window's contents) Hypertext Markup Language (HTML) and/or Dynamic HTML (DHTML) page data for display.

The scanning software 52 is in communication with a scanner or other scan code source (not shown) through an input/output port (not shown) (see, e.g., FIG. 6 items 418, 440). Alternate scan code sources include codes manually entered, such as by keyboard input, or by retrieval from a database containing scan data. The browser 54 is in communication with a network interface 70, such as a Network Interface Card (NIC), Universal Serial Bus (USB), or other networking implementation. This interface 70 provides access to a network 76, such as the Internet, by which information about scan data is obtained. As discussed further below with reference to FIG. 2, devices have associated scan codes, which are obtained (as scan data) and utilized to obtain information about a defective device.

Figure 2:
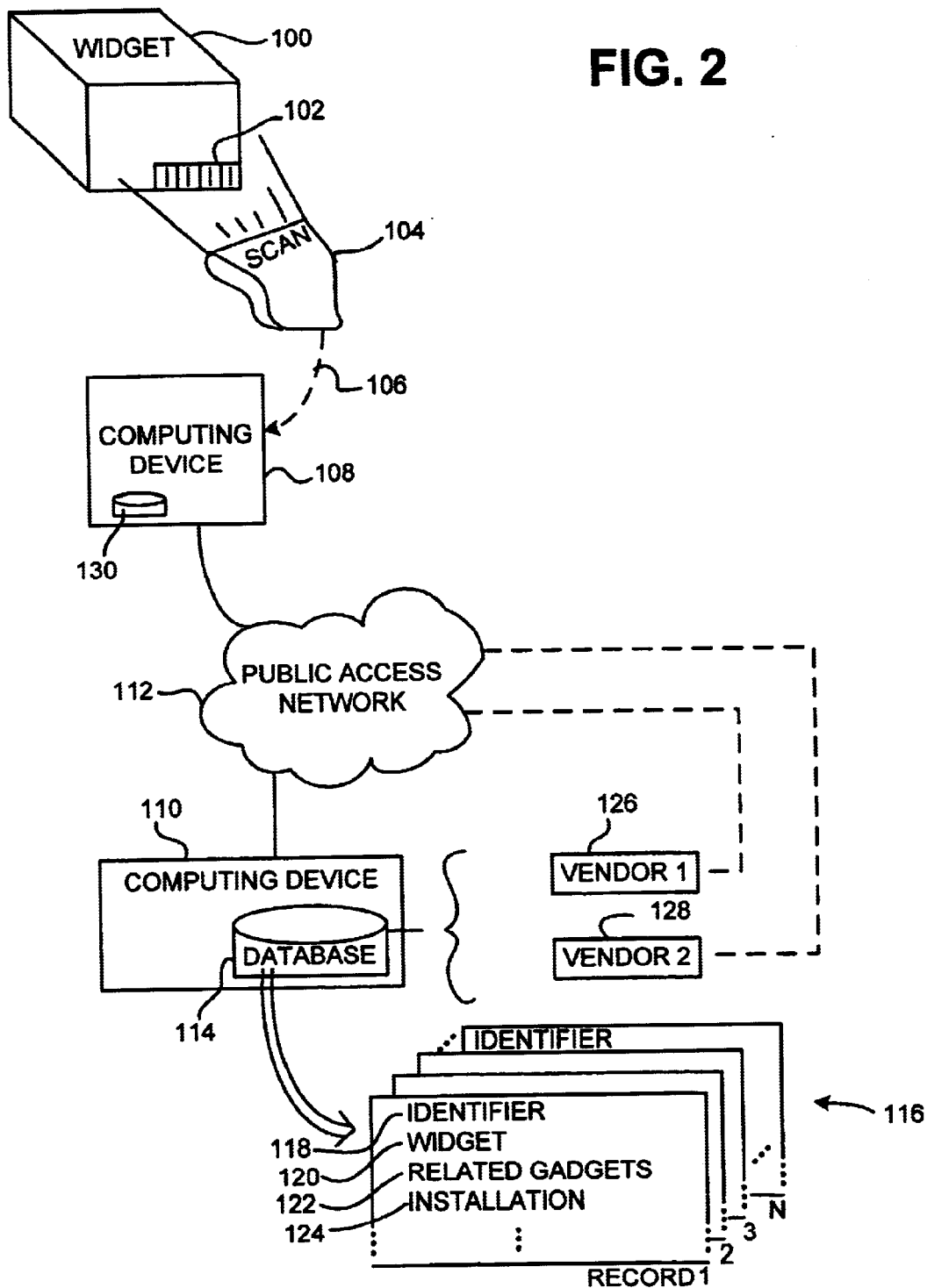
FIG. 2 illustrates a general environment in which claimed embodiments can be practiced.

Scan data corresponds to traditional bar code formats, as well as other formats not ordinarily considered a scan code, such as magnetic strips, text string identifiers (e.g., a brand name or product name) that is scanned or manually entered, and the like (see also FIG. 2 discussion)

After the scanning software 52 obtains scan data, the browser is directed to one or more Internet locations for obtaining further data corresponding to the scan input. In a simple configuration, a search query 66 is prepared and submitted to one or more search engines 72, 74, where the search query corresponds to the scan data. The search results 68, if any, are returned and displayed within the browser client window 64. The results will have to be reviewed and interpreted (e.g., by a user or other controlling program, such as an expert system).

In a more complex configuration, the search query 66 can be augmented with product data retrieved from a data storage 78, such as from non-volatile storage, CD-ROM, hard-disk, etc. that may accessible through a local attachment 80 to the computing device 50 (e.g., as an internal installed device), or through attachment 82 to the network 76. In this configuration, the scan data is used to search the storage 78 for further search terms, such as product name, description, manufacturer, etc. The search proceeds as before, however, the additional search information allows the one or more search engines 72, 74 to perform a more refined search, and thus provide more relevant search results 68.

The scan data used to search the storage 78 need not correspond to a unique code such as a Universal Product Code (UPC) bar code. Instead, any distinguishing markings on the part could serve as keys for a database search. Note that product identifiers may only be "partially unique," e.g., unique only with respect to a particular manufacturer, but perhaps duplicated by other manufacturers. In cases where the markings correspond to multiple entries in the storage, a user could be presented with the list of matching items to select the desired item. However, the user is not required to select a particular entry from the list; if desired, all available information can be submitted as key terms for a search.

Although the storage 78 is depicted as a single database in FIG. 1, it could also be implemented as a set of database sources, possibly distributed across the Internet (see, e.g., FIG. 2, items 114, 130). Manufacturers or product distributors can develop cross-reference web pages containing mappings between scan codes and product search keywords; these mappings can be expressed using Extensible Markup Language (XML), Standard Generalized Markup Language (SMGL), Microsoft's Channel Definition Format (CDF), or equivalent technology for describing data semantics. Links to cross-reference pages could be placed at well-known "cross-reference hubs" (e.g., common access points), or such pages can be associated with special keywords to enable part-search software (or generic search engines) to discover the linksthrough an initial Internet search. By this method, the storage 78 would not need to be centrally administered, allowing the search system to scale well.

In a still more complex configuration, the scanning software automatically processes the search results 68 and arranges them for a user. For example, search results from an Internet search will typically include general web pages located throughout the Internet, which would include web pages from manufacturers 84, 86, resellers 88, 90, etc., for a defective part identified by the scan data. The scanning software 52 can employ internal heuristics, such as weighted keyword evaluation of web site content, or other evaluative methods to help identify and categorize the results. If web sites employ XML-based content, XML tags can be used in addition to keyword searches to help identify pages to include in the search results. In addition, manufacturer and reseller can be recorded within storage 78, and utilized to help identify and categorize the search results 68. (This manufacturer and reseller data can be used in composing a search 66.)

FIG. 2 illustrates another embodiment, in which the search for vendors, manufactures and resellers for replacement parts is performed automatically for a user. Shown is a "widget" device 100; this device has a part failure, however the extent of the problem is not yet clear. Affixed to the device 100 is a code 102 that can be scanned with a scanner 104 to identify what the device is. The code can be any type of computer readable medium, such as a bar-code (e.g., a UPC containing a vendor's identification number and product number), encoded magnetic strip, hologram identifier, resonate material, text-string identifier, and the like. For simplicity in presentation, it is assumed herein that the scanner 104 is a traditional bar-code reader, and the affixed identifier 102 is a bar-code.

For some devices, such as those that are small, fragile, extremely hot, etc., it may be impractical for the identifier to be affixed to the device as shown. In such circumstances, the identifier may be located in a different location, such as in a physical directory, or in an electronic database. If stored in a database, a scanner may not be required, since an appropriate bar-code can be located and directly submitted to scanning software. Alternatively, the database can be used to print out a copy of the bar-code, allowing it to be scanned. Note that an expert-type system can be used to aid in searching the database to identify an unlabeled device. Further, as noted above, any identifiable markings on the device could be used in conjunction with the database to obtain scan data for the device.

After obtaining the scan data, the data can be transferred 106 to a computing device. The computing device can be a separate computer-type device (see, e.g., FIG. 6), to which is attached the scanner by cable or wireless technology (e.g., infrared (IR) link). Or the computing device may be integrated with the scanner (see FIG. 5). Once the computing device has the scan data, a remote computing device 110 is contacted through a network connection. As shown, the network is a public access network 112, which includes networks such as the Internet, public corporate intranets, and other public-access networking infrastructures. The scanned code data is used to search through a database 114 on remote computing device 110.

The database 114 contains records 116 for each known device. This database may either be centralized or distributed across multiple entities on a public access network. The database records can include a product identifier 118 such as the scanned code data (the scanned data may be a subset of this identifier), a more human readable identifier 120, such as "widget" or "XYZ Co.'s widget", a list 122 of related "gadgets" to the widget (e.g., encompassing dependency data), other installation issues 124 (e.g., warnings or safety information), vendors for the widget (not shown), as well as other related product information (indicated by ellipses). The record can also contain cross-reference entries to capture interdependencies between different parts. For example, a linked-list can be defined to allow traversal of all related parts for a particular scanned (defective) part. Note that although this description assumes a database for storing part data, other structures, such as COM (Common Object Model) objects and Distributed-COM (DCOM) objects can also be used (e.g., via persistent storage and the like).

Once an appropriate record is located (e.g., by searching with the scanned code data), the record is inspected for registered vendors 126, 128 for the damaged widget 100. This vendor data (e.g., name, address, telephone number, network address, etc.) is conveyed through the public network 112 to the contacting computing device 108. Other record data can be returned as well, and related records can also be retrieved (or retrieved later, if necessary or desired). There can be a large number of known vendors for a particular part. Thus, once potential vendors are identified, a list of available vendors can be prepared. An available vendor refers to one that has a particular part, or related part (e.g., as identified by the linked-list) in stock. However, "available" can also refer to satisfying other user requirements, such as a geographic preference or price. For example, a user may require that vendors be located within 10 miles of the defective part's geographic location. (Note that a default geographic proximity can be defined, such as 10 miles, or zero miles (e.g., no default).)

In addition to preferences relating to obtaining replacement parts, users can have preferences relating to performing the repair or maintenance. Some users have sufficient time and experience (given appropriate instructions) to effect the repair or replacement themselves. Others may prefer a professional service to perform the task (subject to price constraints).

To enforce user preferences, an expert-type system can be used to filter and organize data retrieved from the remote 114 (or local 130 (see following)) database. Expert system rules can be implemented as a Lisp, Prolog, or equivalent interpreted or compiled language program. However, for simple rules, where a user is only concerned about a few characteristics, such as price or location, the complexity and overhead of an expert system can be avoided through application of a series of if . . . then . . . else statements to parse retrieved data. If retrieved data is marked with semantic tags such as XML, parsing the data and interpreting its semantics is greatly simplified. An Extensible Style Language (XSL)-based transformation can be applied to retrieved XML data to filter, sort, and render the results of the search on the browser. (XSL is a template-based method for separating style from content when creating HTML or XML pages.) If semantic analysis is incorporated into the search and retrieval process, this information can be used to cull false hits from global searches performed with non-unique keywords.

Note that in some configurations, the computing device 108 may contain its own database 130 of device records 116. For example, this "local" database may be mirror the remote database 116, or simply contain a subset of database entries. It is understood in the art that various methods exist for scheduling synchronization of distributed databases, if required. That is, databases may be distributed geographically, or according to predicted usage, and known methods may be used to ensure that each local database contains appropriate data. (Content can be limited to typical device entries, with higher-level databases responsible for further entries.) If a database request to a local database 130 fails to provide results, the request can be forwarded to an appropriate higher-level database (e.g., one or more remote databases 114).

Once the vendor data 126, 128, or other record data, is received by the requesting computing device 108, this data may be used to aid a user in replacing a defective part. For example, the data can be simply presented to the user, allowing the user to pick a resource (from the list of available vendors and other locations) for obtaining a replacement part. Or, the data may include information about the defective part and its typical installation environment, where this information is fed to an interactive interface (e.g., an expert-type system) to help a user identify the nature of the problem, and aid in diagnosing a solution.

Thus, for example, assuming the user has scanned a print head from a printer, the interactive interface can inform the user that a print head has been scanned, and then ask the user various questions concerning the status of lights on the printer, hardware settings, the condition of various parts, and the like. With these responses, the interactive system can then identify the probable part failure as well as any related parts that may require replacement along with the print head. This system can also be used to determine that the scanned part might in fact not be defective, and that some other part may be broken. The degree to which an interactive system can aid the user depends on the depth of information stored about the part in the database(s) 114, 130.

Note that even if we assume that products are labeled with a UPC-type bar-code, the practical reality is that such codes are frequently lost. For example, typical consumer items place the code on the packaging—once the packaging is discarded, a user no longer has a code to scan. A search on general product type, or model number, may retrieve an immense number of search results, since (as noted above) such identifiers frequently use common disignations. Thus, it is beneficial to allow manufacturers, suppliers, etc. to provide a cross-reference between descriptive markings on their products and a more precise product identifier. A search can then be performed at a hub to locate more precise information, such as distinctive product identifier, manufacturer data, etc. Usage of cross-reference hubs provides for narrower search results, since the context of the search is more refined than a typical "general" web search.

Note also that as with most endeavors, implementing a cross-referencing system has its associated costs, such as manpower required to setup and maintain cross-reference sites, network service provider costs to maintain public access to the site, and other typical business costs. Consequently, a system can be implement where manufacturers are charged to have their products listed at a hub, allowing them the convenience of simpler product identifiers on their products, with the benefits inherent to targeting search results for a consumer needing to replace consumables. Such targeting can be arranged to always provide search results having the manufacturer given as a primary search result, thus increasing manufacturer business traffic.

Figure 3:
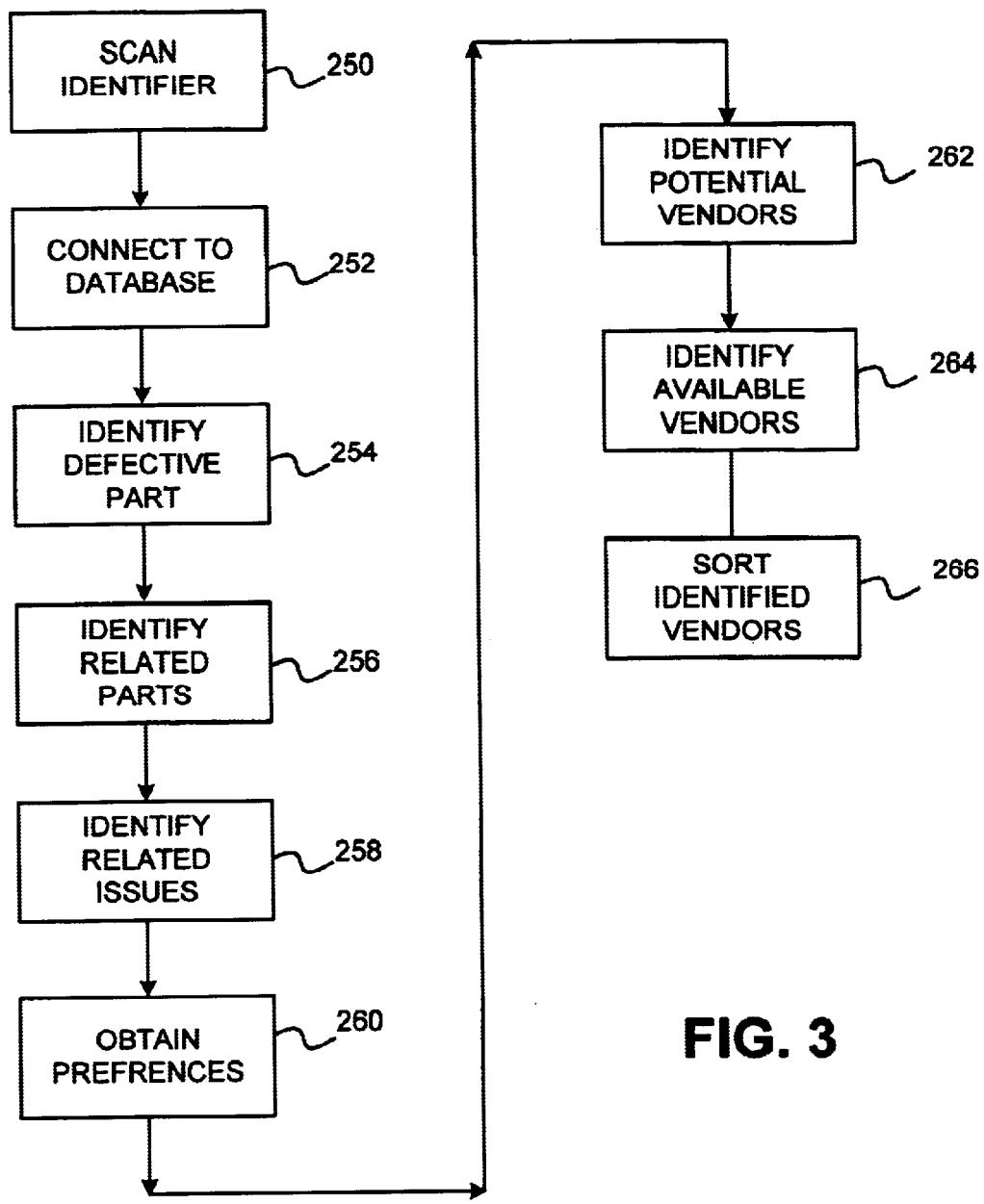
FIG. 3 is a more detailed flow-chart illustrating identifying an available vendor(s) for a defective part and related pieces.

FIG. 3 is a more detailed flow-chart illustrating identifying an available vendor(s) for a unknown defective part and related pieces. As discussed in FIG. 2, a defective part is scanned 250 and a database connected to 252 to identify the defective part. Here, the identity of the scanned part is completely unknown. If some duct work were determined to be failing, one might not know exactly what the duct work was (beyond it obviously being some sort of metal tubing). Hence, after scanning an identifier for the defective tubing, the database can be consulted to determine what the defective part is.

After identifying 254 the part, the database is searched to identify 256 related parts. As discussed above, related parts are those parts that ought to be replaced along with a defective part. Typically, such related parts do not appear to require replacement. A search for related parts can be performed through a linked-list type data structure that can be maintained by cross-referencing database records. Other linking methods can be used as well.

After identifying 256 related parts, the database can be searched 258 to identify related issues, such as installation instructions, ordering methods or requirements, safety tips, etc. For example, if the defective part were a printer toner cartridge, a related concern might be cleaning internal printer parts before installation of a new cartridge. These concerns can be presented to a user to guide proper replacement of a defective part.

Given the part, related part, and other related data, user preferences are obtained 260 (they may already be present as stored preferences) and used to cull the retrieved data according to the user preferences. That is, a list of all potential vendors is identified 262, and per user preferences, a list of available vendors is identified 264. In addition to state user preferences, other preferences can be implied, even if not specified by the user, e.g., the system can require that a replacement part be in vendor stock for the vendor to qualify as being available. Ones skilled in the art will also recognize that search optimizations can be used to streamline the retrieval process (e.g., SQL query optimizations). That is, rather than obtaining a list of all vendors in advance, as such a list may be quite large, user preferences can be obtained first, and then used to speed up the search process.

For example, user preferences can be reviewed to identify the most uncommon preference, and this preference can be used to reduce the search set, thus making the search more efficient. Assume preferences are (1) vendors within 50 miles, and (2) a cost of less than $50. If the retail value of the part is $75, then there are going to be few, if any, vendors offering the part for $50. But, there may be many vendors within 50 miles of the part to be replaced (note that geographic references are presumed to concern part locations versus vendor locations, and not user location versus vendor location). Thus, a set of all possible vendors can be significantly reduced by first applying the cost constraint, and then, if any potential vendors remain, applying the second geographic constraint. But, for clarity of presentation, it is assumed herein that no particular search optimizations are performed.

After identifying available vendors 264, these vendors can then be sorted 266 according to certain user preferences. For example, the user may desire to sort available vendors according to price, and then by nearest vendor location, and then by expected delivery time.

Figure 4:
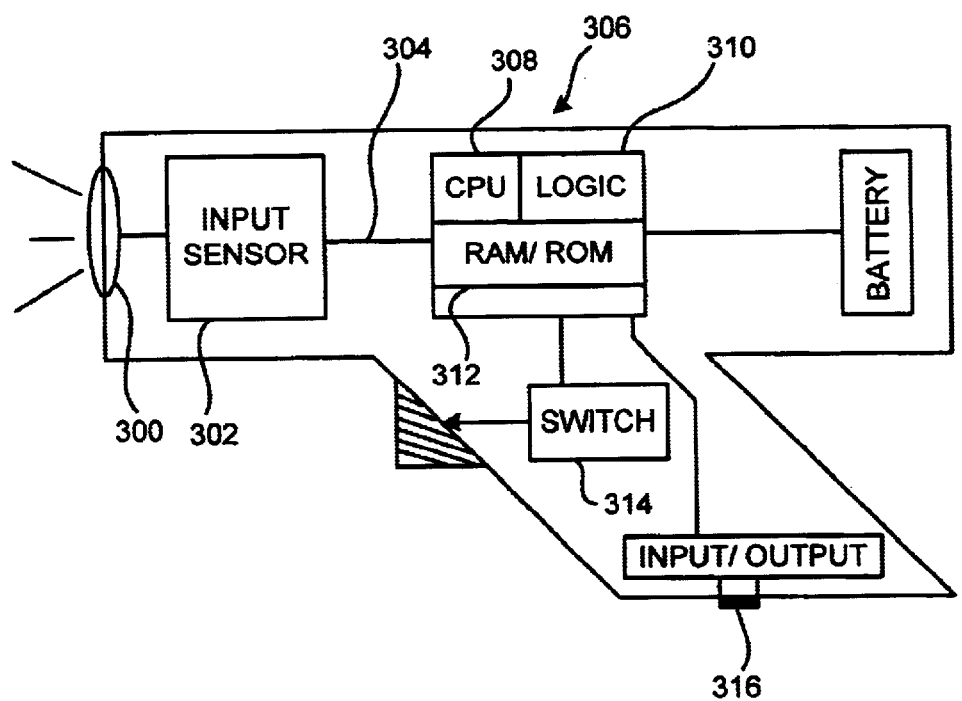
FIG. 4 illustrates a scanning device.

FIG. 4 illustrates a simplified scanning device. As shown, the device includes an input lens 300 in communication with an input sensor 302 (although depicted separately, they may be formed as a single unit). The input sensor can be a laser or LED emitter/receiver combination, a charge coupled device (CCD), or other sensor capable of receiving input data corresponding to an input image (e.g., a bar code, pictoral/graphic identifier, text, etc.).

The output 304 from the input sensor 302 is a signal corresponding to the data being seen by the input lens 300. The output is input to scanner circuitry 306 which receives and processes the scanned data. The scanner circuitry generally includes a central processing unit 308 (CPU) and logic control code 310. There may also be RAM/ROM or other memory storage, if needed, for operation of the device. It is understood that the CPU 308 and logic control code may be encoded as dedicated circuitry for performing the scanning task, or may be implemented as a special-purpose integrated circuit. However, since the scanning device may be configured to include local database information, as well as other computing device functionality, the scanner is depicted in a more general form amenable to such more-advanced configurations.

Also shown is a trigger mechanism 314 that can be used to control activation of the lens 300 and input sensor. In an emitter/receiver configuration, the trigger causes appropriate emissions and checking for received scan data. In a CCD context, the trigger causes a snapshot to be taken of what the CCD is currently receiving as input data. Depending on the CCD configuration, the CCD may be unpowered until the trigger causes power to be provided to the CCD, and the CCD subsequently reads to obtain scan data.

Also shown is an input/output port 316 to allow the scanning device to be attached to a computing device, such as a home computer, personal information manager, advanced cellular telephone, and the like. However, with the possibilities afforded by advanced microelectronics, the external computing device may instead be integrated within the scanning device itself. If completely integrated, then input/output port 316 can be an external interface for a network interface card allowing the scanner to contact the public switched network directly (see FIG. 1). The external (or integrated) computing device receives the scanned data from the input/output port 316, and can then begin the process of identifying and ultimately replacing a scanned part (and its related parts).

Figure 5:
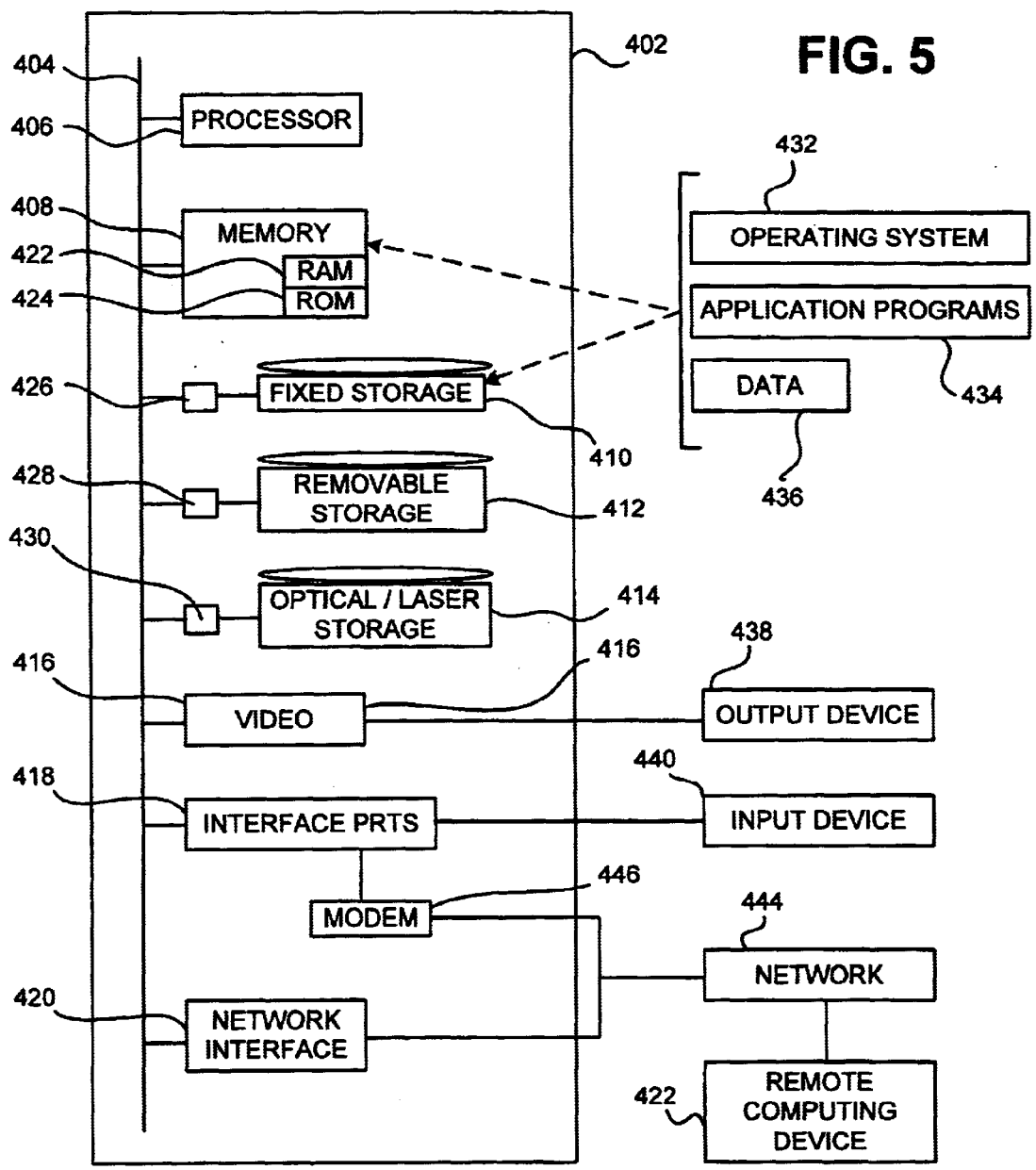
FIG. 5 illustrates one embodiment for a computing device with which the invention may operate.

FIG. 5 and the following discussion is intended to provide a brief, general description of suitable computing devices (see, e.g., FIG. 1, item 108) with which the invention may operate. And, even though the invention and related computing devices may be described by reference to different high-level program modules and/or low-level hardware contexts, one skilled in the art realizes that program module references can be interchanged with low-level instructions and hardware encoding.

Program modules include procedures, functions, programs, components, data structures, and the like, that perform particular tasks or implement particular abstract data types. The modules may be incorporated into single and multi-processor computing systems, as well as hand-held devices and controllable consumer devices. It is understood that modules may be implemented on a single computing device, or processed over a distributed network environment, where modules can be located in both local and remote memory storage devices (see, e.g., FIG. 1, items 114, 130).

An exemplary system for implementing the invention includes a computing device 402 having system bus 404 for coupling together various components within the computing device. The system 404 bus may be any of several types of bus structure including a memory bus or memory controller, a peripheral bus, and a local bus using any of a variety of conventional bus architectures such as PCI, AGP, VESA, Microchannel, ISA and EISA, to name a few. Note that only a single bus is illustrated, although plural buses typically achieve performance benefits. Typically, attached to the bus 402 are a processor 406, a memory 408, storage devices (e.g., fixed 410, removable 412, optical/laser 414), a video interface 416, input/output interface ports 418, and a network interface 420.

The processor 406 may be any of various commercially available processors, including Intel processors, or the DEC Alpha, PowerPC, programmable gate arrays, signal processors, or the like. Dual, quad processors, and other multi-processor architectures also can be used. The system memory includes random access memory (RAM) 422, and static or re-programmable read only memory (ROM) 424. A basic input/output system (BIOS), stored in ROM, contains routines for information transfer between device 402 components or device initialization.

The fixed storage 410 generally refers to hard drive and other semi-permanently attached media, whereas removable storage 412 generally refers to a device-bay into which removable media such as a floppy diskette is removably inserted. The optical/laser storage 414 include devices based on CD-ROM, DVD, or CD-RW technology, and are usually coupled to the system bus 404 through a device interface 426, 428, 430. The storage systems and associated computer-readable media provide storage of data and executable instructions for the computing device 402. Note that other storage options include magnetic cassettes, tapes, flash memory cards, memory sticks, digital video disks, and the like.

The exemplary computing device 402 can store and execute a number of program modules within the RAM 422, ROM 424, and storage devices 410,412, 414. Typical program modules include an operating system 432, application programs 434 (e.g., a web browser or network application program), etc., and application data 436. Program module or other system output can be processed by the video system 416 (e.g., a 2D and/or 3D graphics rendering device), which is coupled to the system bus 404 and an output device 438. Typical output devices include monitors, flat-panels displays, liquid-crystal displays, and recording devices such as video-cassette recorders.

A user of the computing device 402 is typically a person interacting with the computing device through manipulation of an input device 440. It is expected that the input device is a scanner as depicted in FIG. 4. However, other common input devices include a keyboard, mouse, tablet, touch-sensitive surface, digital pen, joystick, microphone, game pad, satellite dish, etc. One can also provide input through manipulation of a virtual reality environment, or through processing the output from a data file or another computing device.

The computing device 402 is expected to operate in a networked environment using logical connections to one or more remote computing devices. One such remote computing device 442 may be a web server or other program module utilizing a network application protocol (e.g., Hyper-Text Transport Protocol (HTTP), File Transfer Protocol (FTP), Gopher, Wide Area Information Server (WAIS)), a router, a peer device or other common network node, and typically includes many or all of the elements discussed for the computing device 402. The computing device 402 has a network interface 420 (e.g., an Ethernet card) coupled to the system bus 404, to allow communication with the remote device 442. Both the local computing device 402 and the remote computing device 442 can be communicatively coupled to a network 444 such as a WAN, LAN, Gateway, Internet, or other public or private datapathway. It will be appreciated that other communication links between the computing devices, such as through a modem 446 coupled to an interface port 418, may also be used.

In accordance with the practices of persons skilled in the art of computer hardware and software programming, the present invention is described with reference to acts and symbolic representations of operations that are sometimes referred to as being computer-executed. It will be appreciated that the acts and symbolically represented operations include the manipulation by the processor 406 of electrical signals representing data bits which causes a resulting transformation or reduction of the electrical signal representation, and the maintenance of data bits at memory locations in the memory 408 and storage systems 410, 412, 414, so as to reconfigure or otherwise alter the computer system's operation and/or processing of signals. The memory locations where data bits are maintained are physical locations having particular electrical, magnetic, or optical properties corresponding to the data bits.

Having described and illustrated the principles of the invention with reference to illustrated embodiments, it will be recognized that the illustrated embodiments can be modified in arrangement and detail without departing from such principles.

What is claimed as the invention, is all such modifications as may come within the scope and spirit of the following claims and equivalents thereto.

What is claimed is:

1. A method for determining part replacement related information by an end user, comprising:
   obtaining an associated identifier of a first part;
   automatically coupling by a scanner interface the identifier of the first part to a network enabled browser;
   automatically retrieving by the browser from a remote database replacement related information for the first part;
   determining a replacement dependency between the first part and a second part that should be replaced along with first part;
   automatically retrieving by the browser from the remote database, based at least in part on the determined replacement dependency, replacement related information for the second part; and
   automatically displaying by the browser for the end user the retriever replacement related information for the first part.

2. A method according to claim 1, wherein the identifier of the part is a selected one of a UPC identifier, product-identifier mark, and textual product identifier.

3. A method according to claim 1, further comprising:
   obtaining at least one user preference; and
   arranging the retrieved replacement related information according to the at least one user preference.

4. A method according to claim 3, wherein the user preference is a selected one of limiting price, limiting distance to travel to obtain a replacement part, limiting shipping time for the replacement part, limiting time to effect part replacement, and only displaying a vendor having the replacement part in stock.

5. A method according to claim 4, further comprising:
categorizing the retrieved replacement related information into plural categories;
wherein such categories are sorted according to the at least one user preference.

6. A method according to claim 3, further comprising:
identifying at least one provider within the retrieved replacement related information having a replacement part in stock; and
prominently displaying the at least one provider;
wherein prominently displaying includes sorting the retrieved replacement related information so that the at least one provider is at the top of such retrieved information.

7. A method according to claim 1, in which the network connection is a link with the Internet, the method further comprising:
providing the associated identifier in a predetermined format, such format being a selected one of a bar-code format, a product-identifier mark, and a verbal identifier.

8. A method according to claim 1, the method further comprising:
contacting a cross-reference hub;
searching the cross-reference hub with the associated identifier to obtain at least one additional product identifier; and
automatically searching the remote database with the at least one additional product identifier to retrieve replacement related information for the part.

9. A method according to claim 8, wherein the associated identifier is a non-unique product category reference, and the at least one additional product identifier is partially unique.

10. A method according to claim 8, further comprising:
semantically analyzing the retrieved replacement related information; and
reorganizing the retrieved replacement related information according to such analysis.

11. An article of manufacture, comprising:
a computer readable medium;
wherein encoded on the computer readable medium are instructions capable of causing a processor to perform the steps of claim 1.

12. A method according to claim 1, in which the replacement related information includes related part data identifying the second part.

13. A method according to claim 1, further comprising:
determining a geographic location for the part;
identifying vendors of a replacement part for the part, each vendor having a geographic location; and
sorting the vendors according to their geographic proximity to the part.

14. A method according to claim 13, further comprising:
providing a proximity preference, such preference set to user election if such election has been made, otherwise to a predetermined value; and
culling the retrieved replacement information according to the proximity preference.

15. A method according to claim 1, further comprising:
receiving user-specified price terms for a replacement part for the part;
identifying, from the retrieved replacement information, a sales price offered by vendors for the replacement part; and
culling the retrieved replacement information according to the user-specified price terms.

16. A method according to claim 1, the method further comprising:
retrieving from the remote database replacement related concerns, such concerns including warning and suggestions for a user seeking to replace the part; and
displaying the replacement related concerns to the user.

17. A method according to claim 16, wherein an expert system interactively displays the replacement related concerns and notification of related parts requiring replacement.

18. A method according to claim 7, wherein the associated identifier is a bar-code and wherein a portable bar-code scanner is utilized to obtain the associated identifier.

19. A system for determining part replacement related information by an end user, comprising:
a scanner for scanning an associated identifier of a part;
a network-enabled browsing arrangement; and
a scanner interface facilitating communication between the scanner interface and the network-enabled browsing arrangement, such communication including transferring the associated identifier to the browsing arrangement;
wherein the browser automatically connects to a remote database over a network to retrieve replacement related information for the first part, determines a replacement dependency between the first part and a second part which should be replaced along with the first part, and automatically retrieves, based at least in part on the determined replacement dependency, replacement related information for the second part.

20. A system according to claim 19, further comprising:
a computing device comprising a processor capable of being directed to process commands stored in a program memory, and an input/output port;
wherein
the scanner is in communication with the input/output port,
the browsing arrangement is provided as a first sequence of program commands stored in the program memory for execution by the processor, and
the scanner interface is provided as a second sequence of program commands stored in the program memory for execution by the processor, where the scanner interface receives the scanned associated identifier through the input/output port and provides such identifier to the browsing arrangement.

21. A system according to claim 20, wherein the scanner is incorporated into the computing device.

22. A system, comprising:
means for scanning an associated identifier of a first part by the end user;
means for automatically coupling by a scanner interface the scanned identifier of the first part to a network enabled browser;
means for automatically connecting by the browser over a network connection to a remote database to retrieve replacement related information for the first part, determining a replacement dependency between the first part and a second part which should be replaced along with the first part, and automatically retrieving, based at least in part on the determined replacement dependency, replacement related information for a second part, such database searchable by the associated identifier; and means for automatically displaying by the browser for the end user the retrieved replacement related information for the first part.

23. A system according to claim 22, further comprising:
means for obtaining at least one user preference; and
means for arranging the retrieved replacement related information according to the at least one user preference.

24. A method for determining part replacement related, comprising:
obtaining an identifier of a first part with a scanner communicatively coupled to an expert system;
automatically connecting by the expert system over a network connection to at least one remote database to retrieve, based at least on the identifier, replacement related information for the first part;
determining a replacement dependency between the first part and a second part which should be replaced along with the first part;
automatically connecting by the expert system over the network connection to the remote database to retrieve, based at least in part on the determined replacement dependency, replacement related information for the second part;
receiving candidate results from the at least one remote database; and
processing by the expert system of the candidate results to identify one or more replacements for the first part.

25. The method of claim 24, wherein the replacement related information for the first part includes replacement related information for the second part suggested to be replaced along with the first part.

26. The method of claim 24, further comprising:
displaying in a web browser a web page identifying the one or more replacements for the first part.

27. The method of claim 24, further comprising:
obtaining at least one user preference; and
culling by the expert system of retrieved replacement related information according to the at least one user preference.

28. The method of claim 27, wherein the user preference is a selected one of limiting price, limiting distance to travel to obtain a replacement part, limiting shipping time for the replacement part, limiting time to effect part replacement, and only displaying a vendor having the replacement part in stock.

29. The method of claim 23, further comprising:
displaying in a web browser a web page identifying the one or more replacements for the first part satisfying the at least one user preference.

30. A method for locating a replacement part for an item having one or more replaceable parts, comprising:
determining an identifier for a part requiring replacement;
providing the identifier to a network application program communicatively coupled with a database searchable by at least the identifier, the database associating the part with related parts of the item, if any, that have a replacement dependency with the part and therefore should be replaced along with the part; and
retrieving replacement information from the database for the part and related parts of the item, if any, that should be replaced along with the first part.

31. The method of claim 30, wherein the related parts associated with the part, if any, are recommended by a manufacturer to be replaced along with the part.

32. The method of claim 30, further comprising:
scanning the identifier with a scanner; and
automatically coupling the scanner to the network application program to provide the identifier thereto.

33. The method of claim 30, further comprising:
displaying the replacement information to an end-user.

34. The method of claim 30, wherein the identifier of the part is a selected one of a UPC identifier, product-identifier mark, and textual product identifier.

35. The method of claim 30, further comprising: receiving a restriction; and
identifying at least one portion of the retrieved replacement information satisfying the restriction.

36. The method of claim 30, further comprising:
obtaining a preference; and
arranging the retrieved replacement information according to the preference.

37. The method of claim 36, wherein the preference is a selected one of: limiting price, limiting distance to travel to obtain the replacement part, limiting shipping time for the replacement part, limiting time required to install the replacement part, only displaying vendors having the replacement part in stock, and only displaying vendors stocking the replacement part and related parts, if any, that should be replaced along with the first part.

38. The method of claim 37, further comprising:
categorizing the retrieved replacement related information into plural categories.

39. A method according to claim 38, further comprising:
sorting the categories according to the preference.

40. The method of claim 30, further comprising:
determining sources from which the replacement part may be obtained;
identifying, based at least in part on the replacement information, at least one source having the replacement part in stock; and
presenting the sources from which the replacement part may be obtained, said presenting including prominently displaying the at least one source having the replacement part in stock.

41. The method of claim 40, wherein prominently displaying includes sorting the sources from which the replacement part may be obtained so that the at least one source having the replacement part in stock is provided before sources not having the replacement part in stock.

42. The method of claim 30, further comprising:
receiving an oral utterance; and
converting the oral utterance into the identifier.

43. The method of claim 30, further comprising:
providing the identifier to the network application program in a selected one of the following formats: a bar-code format, a product-identifier mark, and a verbal identifier.

44. The method of claim 30, further comprising:
determining an equivalence identifier for a substitution part which may be used to replace the part;
providing the equivalence identifier to the network application program communicatively coupled with the database, the database also being searchable by the equivalence identifier.

45. The method of claim 30, further comprising:
determining an equivalence identifier for a substitution part which may be used to replace the part;
providing the identifier to the network application program communicatively coupled with a equivalence database searchable by at least the equivalence identifier, the equivalence database associating the substitution part with related substitute parts of the item, if any, that should be replaced along with the first part.

46. The method of claim 45, wherein the database and the equivalence database are separate databases.

47. The method of claim 37, further comprising:
semantically analyzing the retrieved replacement information; and
reorganizing the retrieved replacement information according to the analyzing.

48. The method of claim 30, further comprising:
determining a geographic location for the part;
identifying vendors of the replacement part, each vendor having a geographic location; and
sorting the vendors according to their geographic proximity to the part.

49. A method according to claim 30, further comprising:
providing a proximity preference, such preference set to a user election if such election has been made, otherwise to a default value; and
culling the retrieved replacement information according to the proximity preference.

50. The method of claim 30, further comprising:
receiving user-specified price terms for a replacement part for the part;
identifying vendors of the replacement part based at least in part on the retrieved replacement information;
identifying a sales price offered by said vendors for the replacement part; and
culling the retrieved replacement information according to the user-specified price terms.

51. The method of claim 30, further comprising:
retrieving from the database replacement related concerns, such concerns including warnings and suggestions for a user seeking to replace the part; and
displaying the replacement related concerns.

52. The method of claim 51, wherein an expert system interactively displays the replacement related concerns.

53. The method of claim 30, the method further comprising:
providing questions to the network application program regarding circumstances surrounding a failure, and receiving a response thereto;
determining based on the response that the part requiring replacement is not broken but that an other part is instead broken; and
retrieving replacement information for the other part.

54. An article comprising a machine-accessible media having associated data, wherein the data, when accessed, results in a machine performing:
determining an identifier for a part requiring replacement;
providing the identifier to a network application program communicatively coupled with a database searchable by at least the identifier, the database associating the part with related parts of the item, if any, that have a replacement dependency with the part and therefore should be replaced along with the part; and
retrieving replacement information from the database for the part and the related parts of the item, if any, that should be replaced along with the first part.

55. The article of claim 54 wherein the machine-accessible media further includes data that, when accessed, results in the machine performing:
scanning the identifier with a scanner; and
automatically coupling the scanner to the network application program to provide the identifier thereto.

56. The article of claim 54 wherein the machine-accessible media further includes data that, when accessed, results in the machine performing:
determining sources from which the replacement part may be obtained;
identifying, based at least in part on the replacement information, at least one source having the replacement part in stock; and
presenting the sources from which the replacement part may be obtained, said presenting including prominently displaying the at least one source having the replacement part in stock.

57. The article of claim 54 wherein the machine-accessible media further includes data that, when accessed, results in the machine performing:
receiving an oral utterance; and
converting the oral utterance into the identifier.

58. The article of claim 54 wherein the machine-accessible media further includes data that, when accessed, results in the machine performing:
determining an equivalence identifier for a substitution part that may be used to replace the part;
providing the equivalence identifier to the network application program communicatively coupled with the database, the database also searchable by the equivalence identifier.

59. The article of claim 54 wherein the machine-accessible media further includes data that, when accessed, results in the machine performing:
determining a geographic location for the part;
identifying vendors of the replacement part, each vendor having a geographic location; and
sorting the vendors according to their geographic proximity to the part.

60. The article of claim 54 wherein the machine-accessible media further includes data that, when accessed, results in the machine performing:
providing a proximity preference, such preference set to a user election if such election has been made, otherwise to a default value; and
culling the retrieved replacement information according to the proximity preference.

61. The article of claim 54 wherein the machine-accessible media further includes data that, when accessed, results in the machine performing:
receiving user-specified price terms for a replacement part for the part;
identifying vendors of the replacement part based at least in part on the retrieved replacement information;
identifying a sales price offered by said vendors for the replacement part; and
culling the retrieved replacement information according to the user-specified price terms.

62. The article of claim 54 wherein the machine-accessible media further includes data that, when accessed, results in the machine performing:
retrieving from the database replacement related concerns, such concerns including warnings and suggestions for a user seeking to replace the part; and
displaying the replacement related concerns.

63. A system for locating a replacement part for an item having one or more replaceable parts, comprising:

a scanner for scanning an identifier for a part requiring replacement; and a device operating a network application program communicatively coupled with a database searchable by at least the identifier, the database associating the part with related parts of the item, if any, that have a replacement dependency with the part and therefore should be replaced along with the part; the network application program configured to retrieve replacement information from the database for the part and related parts of the item, if any, that should be replaced along with the first part.

64. The system of claim 63, wherein the scanner is incorporated into the device.

65. The system of claim 63, wherein the scanner is wirelessly communicatively coupled with the device.

66. The system of claim 63, further comprising:

an input for the device from which may be received a restriction; and wherein the network application program operates to identify at least one portion of the retrieved replacement information satisfying the user restriction.

67. The system of claim 63, further comprising:

an input for the device from which may be received a preference;

wherein the network application program operates to arrange the retrieved replacement information according to the preference.

68. The system of claim 63, further comprising:

an input for the device from which may be received an oral utterance; and conversion logic communicatively coupled to the input and the device for converting the oral utterance into the identifier.

* * * * *